(12) United States Patent
Nakano et al.

(10) Patent No.: US 12,051,803 B2
(45) Date of Patent: Jul. 30, 2024

(54) NEGATIVE ELECTRODE FOR NON-AQUEOUS ELECTROLYTE SECONDARY BATTERY AND NON-AQUEOUS ELECTROLYTE SECONDARY BATTERY USING THE SAME

(71) Applicant: NISSAN MOTOR CO., LTD., Yokohama (JP)

(72) Inventors: Takeshi Nakano, Kanagawa (JP); Atsushi Ito, Kanagawa (JP); Wataru Ogihara, Kanagawa (JP); Yusuke Nakashima, Kyoto (JP); Kazuya Minami, Kyoto (JP); Naofumi Shoji, Kyoto (JP); Kaho Suzuki, Kyoto (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 691 days.

(21) Appl. No.: 17/283,413

(22) PCT Filed: Oct. 2, 2019

(86) PCT No.: PCT/JP2019/038977
§ 371 (c)(1),
(2) Date: Apr. 7, 2021

(87) PCT Pub. No.: WO2020/075597
PCT Pub. Date: Apr. 16, 2020

(65) Prior Publication Data
US 2021/0384497 A1  Dec. 9, 2021

(30) Foreign Application Priority Data
Oct. 12, 2018  (JP) ................................. 2018-193618

(51) Int. Cl.
*H01M 4/38* (2006.01)
*H01M 4/583* (2010.01)
(Continued)

(52) U.S. Cl.
CPC ........... *H01M 4/386* (2013.01); *H01M 4/583* (2013.01); *H01M 4/622* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2007/0048609 A1 | 3/2007 | Ueda et al. | |
| 2015/0072214 A1* | 3/2015 | Suzuki | ................ H01M 50/423 524/35 |

(Continued)

FOREIGN PATENT DOCUMENTS

| | | |
|---|---|---|
| CN | 107845797 A | 3/2018 |
| JP | 2004-349164 A | 12/2004 |

(Continued)

OTHER PUBLICATIONS

Takeshi Miyamoto et al., Advanced Battery System for Electric Vehicle (FEV-II), Japan Electric Vehicle Association (JEVA), 13th International Electric Vehicle Symposium, Oct. 13-16, 1996, 8 pages.

*Primary Examiner* — Zhongqing Wei
(74) *Attorney, Agent, or Firm* — Foley & Lardner LLP (57) ABSTRACT

Provided is a technique capable of further improving the cycle characteristics in a negative electrode for a non-aqueous electrolyte secondary battery in which a silicon-based negative electrode active material and a carbon-based negative electrode active material are used in combination as a negative electrode active material, and constituent components of the electrode are not bound to each other via a binder. The negative electrode for a non-aqueous electrolyte secondary battery according to the present invention has a configuration in which a negative electrode active material layer containing a negative electrode active material is formed on a surface of a current collector. The negative electrode active material contains composite secondary particles in which silicon-based negative electrode active material particles and carbon-based negative electrode active material particles are bound to each other via a binder. Here, the content of the binder in the composite secondary particles is 1% by mass or more with respect to the total mass of the silicon-based negative electrode active material particles and the carbon-based negative electrode active material particles. Further, in the negative electrode active mate- (Continued)

rial layer, the composite secondary particles are characterized to exist in a state of being not bound to each other via a binder.

10 Claims, 2 Drawing Sheets

(51) Int. Cl.
  *H01M 4/62* (2006.01)
  *H01M 4/02* (2006.01)

(56) References Cited

U.S. PATENT DOCUMENTS

2020/0020938 A1\* 1/2020 Mizuno ................ H01M 4/366
2020/0091508 A1   3/2020 Ohsawa et al.

FOREIGN PATENT DOCUMENTS

| | | |
|---|---|---|
| JP | 2007-95670 A | 4/2007 |
| JP | 2015-149208 A | 8/2015 |
| JP | 2016-46151 A | 4/2016 |
| JP | 2016-066529 A | 4/2016 |
| JP | 2018-101623 A | 6/2018 |
| JP | 2018-101625 A | 6/2018 |
| WO | WO 2018/174300 A1 | 9/2018 |

\* cited by examiner

NEGATIVE ELECTRODE FOR NON-AQUEOUS ELECTROLYTE SECONDARY BATTERY AND NON-AQUEOUS ELECTROLYTE SECONDARY BATTERY USING THE SAME

TECHNICAL FIELD

The present invention relates to a negative electrode for a non-aqueous electrolyte secondary battery and a non-aqueous electrolyte secondary battery using the same.

BACKGROUND ART

In recent years, there is an urgent need to reduce the amount of carbon dioxide in order to deal with air pollution and global warming. The automobile industry expects that the introduction of electric vehicles (EV) or hybrid electric vehicles (HEV) will lead to a reduction in carbon dioxide emissions. Thus, intensive efforts are being made to develop a non-aqueous electrolyte secondary battery such as a secondary battery for motor driving which holds the key to the practical application of those electric vehicles.

The secondary battery for motor driving is required to have extremely high output characteristics and high energy as compared with a consumer lithium ion secondary battery used in mobile phones, notebook computers, and the like. Therefore, the lithium ion secondary battery, which has the highest theoretical energy among all realistic batteries, is attracting attention and is currently being rapidly developed.

The lithium ion secondary battery generally has a configuration in which a positive electrode in which a positive electrode active material or the like is applied to both sides of a positive electrode current collector using a binder, and a negative electrode in which a negative electrode active material or the like is applied to both sides of a negative electrode current collector using a binder are connected to each other via an electrolyte layer, and are housed in a battery case.

In the related art, a carbon/graphite-based material, which is advantageous in terms of charge and discharge cycle life and cost, has been used for the negative electrode of the lithium ion secondary battery. However, since the carbon/graphite-based negative electrode materials are charged and discharged by occluding and releasing lithium ions into graphite crystals, there is a drawback that the charge and discharge capacity of 372 mAh/g or more, the theoretical capacity of $LiC_6$, which is the maximum lithium-introduced compound is 372 mAh/g, cannot be obtained. Therefore, it is difficult to obtain the capacity and energy density that satisfies the practical level for vehicle applications that have a cruising distance comparable to that of gasoline vehicles with the carbon/graphite-based negative electrode material.

On the other hand, a battery using a material alloying with Li for the negative electrode is expected as a negative electrode material for vehicle applications because the energy density is improved as compared with the carbon/graphite-based negative electrode material in the related art. For example, a Si material occludes and releases 3.75 mol of lithium ions per mol as shown in the following reaction formula (A) during charging and discharging, and has a theoretical capacity of 3600 mAh/g for $Li_{15}Si_4$ (=$Li_{3.75}Si$).

[Chem. 1]

(A)

However, a lithium ion secondary battery using a material alloying with Li for the negative electrode has a large expansion and contraction at the negative electrode during charging and discharging. For example, the volume expansion when Li ions are occluded is about 1.2 times in the graphite material; whereas in the Si material, when Si and Li are alloyed, the transition from an amorphous state to a crystalline state causes a large volume change (about 4 times), and thus there is a problem that the cycle life of the electrode is shortened. Further, in a case of the Si negative electrode active material, there is a trade-off relationship between the capacity and the cycle durability, and thus there is a problem that it is difficult to improve the cycle durability while exhibiting the high capacity.

Here, JP 2015-149208 A discloses an invention for improving the cycle characteristics of a lithium ion secondary battery using a silicon-based negative electrode active material as a negative electrode material. Specifically, a technique is disclosed in which graphite particles, silicon oxide particles having a composition represented by $SiO_x$ ($0<x\leq 2$), and non-graphitized carbon particles are used as negative electrode active materials. In the column of examples in JP-A-2015-149208, it is disclosed that these negative electrode active materials are dispersed in a 1% by mass aqueous solution of carboxymethyl cellulose (CMC), then styrene-butadiene rubber (SBR), which is a binder, is further added to prepare a negative electrode active material slurry, and this is applied to a surface of a current collector and dried to produce a negative electrode.

SUMMARY OF INVENTION

Technical Problem

According to the studies by the present inventors, in a producing step of a dry electrode containing a binder as disclosed in JP 2015-149208 A, it was found that cracks occur when an electrode active material slurry is dried. Cracks in the electrodes can cause a significant decrease in battery performance. Therefore, in order to prevent the occurrence of such cracks in the electrode, the present inventors have proceeded with a study on a producing method that does not use a binder and does not include a drying step of the electrode active material slurry. The constituent components of the electrode obtained by such a producing method exist in a state of being not bound to each other via a binder.

In the process of the above study, the present inventors have tried to produce a negative electrode in which a silicon-based negative electrode active material and a carbon-based negative electrode active material are used in combination as a negative electrode active material as disclosed in JP 2015-149208 A by using a production method that does not use the binder and the slurry drying step as described above. As a result, it was found that the battery containing the obtained negative electrode was inferior in cycle characteristics.

Therefore, an object of the present invention to provide a technique capable of further improving the cycle characteristics in the negative electrode for a non-aqueous electrolyte secondary battery in which a silicon-based negative electrode active material and a carbon-based negative electrode active material are used in combination as a negative electrode active material, and constituent components of the electrode are not bound to each other via a binder.

Solution to Problem

The present inventors have diligently studied to solve the above problems. As a result, it has been found that by containing composite secondary particles, which are formed by binding negative electrode active material particles containing a silicon-based negative electrode active material and a carbon-based negative electrode active material via a predetermined amount or more of a binder, in the negative electrode active material layer, the above problems can be solved even when the constituent components of the electrode are not bound to each other via a binder, and thereby the present invention has been completed.

That is, the negative electrode for a non-aqueous electrolyte secondary battery according to one embodiment of the present invention has a configuration in which a negative electrode active material layer containing a negative electrode active material is formed on a surface of a current collector. The negative electrode active material contains composite secondary particles in which silicon-based negative electrode active material particles and carbon-based negative electrode active material particles are bound to each other via a binder. Here, the content of the binder in the composite secondary particles is 1% by mass or more with respect to the total mass of the silicon-based negative electrode active material particles and the carbon-based negative electrode active material particles. Further, there is a characteristic that, in the negative electrode active material layer, the composite secondary particles exist in a state of being not bound to each other via a binder.

DESCRIPTION OF EMBODIMENTS

Hereinafter, embodiments of the negative electrode material according to the present invention will be described with reference to the drawings; however, the technical scope of the present invention should be determined based on the description of the claims, and is not limited to only the following embodiments. Hereinafter, the present invention will be described by taking a bipolar lithium ion secondary battery, which is a form of a non-aqueous electrolyte secondary battery, as an example. It should be noted that the dimensional ratios in the drawings are exaggerated for convenience of explanation and may differ from the actual ratios. Further, in the present specification, the bipolar lithium ion secondary battery may be simply referred to as a "bipolar secondary battery", and the electrode for a bipolar lithium ion secondary battery may be simply referred to as a "bipolar electrode".

The negative electrode for a non-aqueous electrolyte secondary battery according to one embodiment of the present invention has a configuration in which a negative electrode active material layer containing a negative electrode active material is formed on a surface of a current collector. The negative electrode active material contains composite secondary particles in which silicon-based negative electrode active material particles and carbon-based negative electrode active material particles are bound to each other via a binder. Here, the content of the binder in the composite secondary particles is 1% by mass or more with respect to the total mass of the silicon-based negative electrode active material particles and the carbon-based negative electrode active material particles. Further, there is a characteristic that, in the negative electrode active material layer, the composite secondary particles are exist in a state of being not bound to each other via a binder.

In the related art, a technique for using a silicon-based negative electrode active material and a carbon-based negative electrode active material in combination has been known. Then, according to the study by the present inventors, it was found that when a negative electrode for a non-aqueous electrolyte secondary battery in which such a negative electrode active material is used in combination is produced by a producing method that does not use a binder and a slurry drying step, the discharge capacity of the battery to be obtained is rapidly reduced (deteriorated) as the charge and discharge cycle progresses. On the other hand, the present inventors have found that the cycle characteristics of the battery can be further improved by using the negative electrode for a non-aqueous electrolyte secondary battery according to the present embodiment. Although the reason is not completely clear, in the negative electrode according to the present embodiment, the silicon-based negative electrode active material and the carbon-based negative electrode active material used in combination are composited via a binder to form composite secondary particles. With this, the carbon-based negative electrode active material can follow the expansion and contraction of the silicon-based negative electrode active material even after these phenomenon, and as a result, it is presumed that the cutting of an electron conduction path in the negative electrode active material layer is suppressed to the minimum, which contributes to the improvement of the cycle characteristics.

<Bipolar Secondary Battery>

Figure 1:
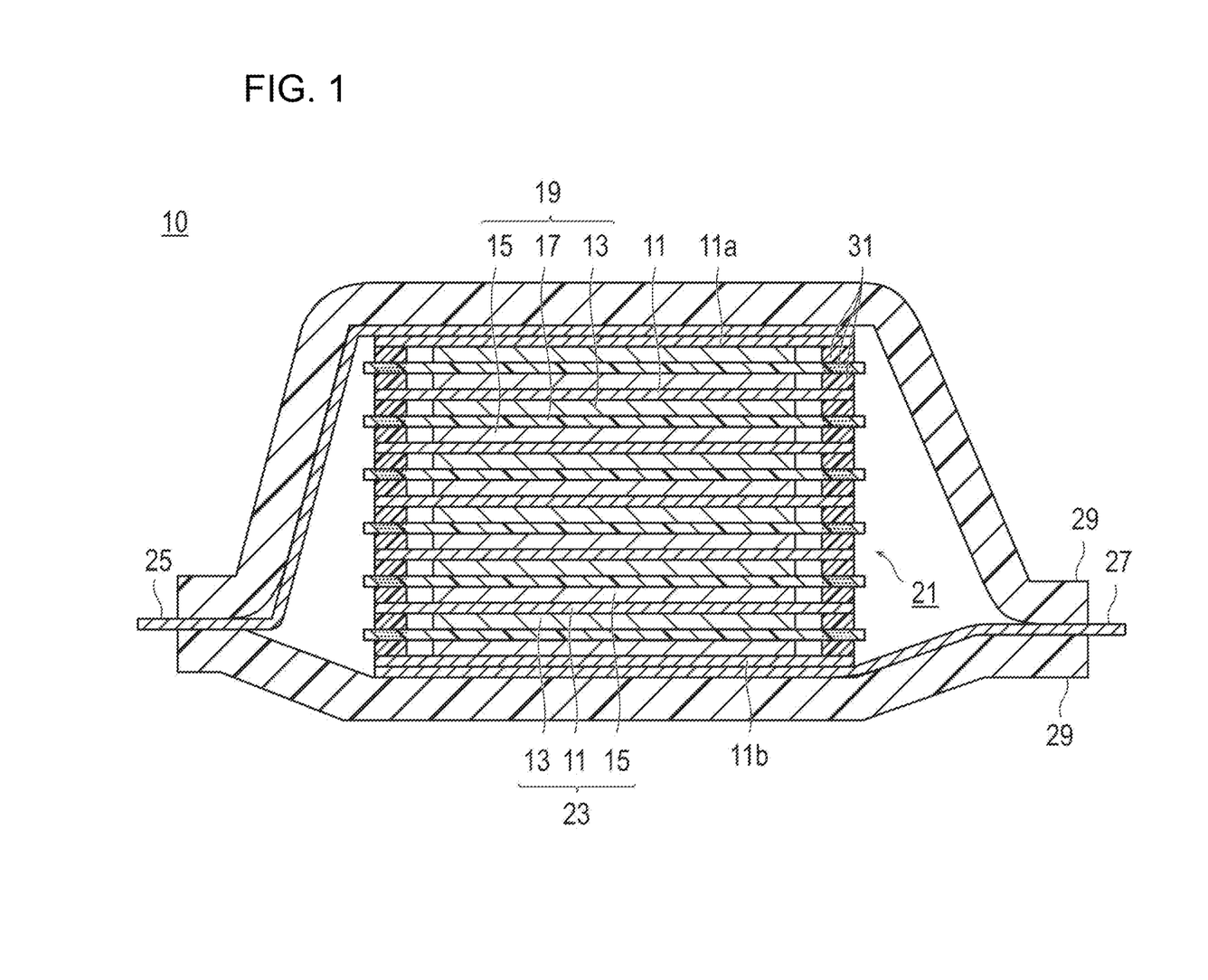
FIG. 1 is a cross-sectional view schematically illustrating a bipolar secondary battery as one embodiment of the present invention.

FIG. 1 is a cross-sectional view schematically illustrating a bipolar secondary battery as one embodiment of the present invention. The bipolar secondary battery 10 illustrated in FIG. 1 has a structure in which a substantially rectangular power generating element 21 in which a charge and discharge reaction actually proceeds is sealed inside a laminated film 29 which is a battery outer casing body.

As illustrated in FIG. 1, the power generating element 21 of the bipolar secondary battery 10 of the present embodiment includes a plurality of bipolar electrodes 23 in which a positive electrode active material layer 13 electrically bonded to one surface of the current collector 11 is formed, and a negative electrode active material layer 15 electrically bonded to the surface opposite to the current collector 11 is formed. Each bipolar electrode 23 is laminated via an electrolyte layer 17 to form a power generating element 21. The electrolyte layer 17 has a structure in which the electrolyte is held in the central portion in a surface direction of a separator as a base material. At this time, the bipolar electrodes 23 and the electrolyte layers 17 are alternately laminated such that the positive electrode active material layer 13 of the one bipolar electrode 23 and the negative electrode active material layer 15 of the other bipolar electrode 23 adjacent to the one bipolar electrode 23 face each other via the electrolyte layer 17. That is, the electrolyte layer 17 is sandwiched between the positive electrode active material layer 13 of the one bipolar electrode 23 and the negative electrode active material layer 15 of the other bipolar electrode 23 adjacent to the one bipolar electrode 23. However, the technical scope of the present invention is not limited to the bipolar secondary battery as illustrated in FIG. 1, and a battery having a similar series connection structure may be used as a result of a plurality of single battery layers being electrically laminated in series, as disclosed in WO 2016/031688 A, for example.

Although not shown, in the bipolar secondary battery 10 of FIG. 1, the negative electrode active material layer 15 contains composite secondary particles (secondary particles formed by binding hard carbon particles and SiO particles via polyacrylic acid, which is a binder) according to one embodiment of the present invention described above, and hard carbon particles that do not form the composite secondary particles, as a negative electrode active material. As a result, it may function as a negative electrode of the secondary battery. In addition, the negative electrode active material layer 15 contains acetylene black and carbon nanofibers as conductive aids.

The adjacent positive electrode active material layer 13, the electrolyte layer 17, and the negative electrode active material layer 15 constitute one single battery layer 19. Therefore, it can be said that the bipolar secondary battery 10 has a configuration in which the single battery layers 19 are laminated. Further, a seal portion (insulating layer) 31 is disposed on an outer peripheral portion of the single battery layer 19. As a result, it prevents liquid leakage due to leakage of the electrolyte solution from the electrolyte layer 17 and prevents a contact of adjacent current collectors 11 in the battery and short circuits caused by, for example, slight irregularities at the ends of the single battery layer 19 in the power generating element 21. The positive electrode active material layer 13 is formed on only one side of the outermost layer current collector 11a on the positive electrode side located in the outermost layer of the power generating element 21. The negative electrode active material layer 15 is formed on only one side of the outermost layer current collector 11b on the negative electrode side located in the outermost layer of the power generating element 21.

Further, in the bipolar secondary battery 10 illustrated in FIG. 1, a positive electrode current collecting plate (positive electrode tab) 25 is disposed so as to be adjacent to the outermost layer current collector 11a on the positive electrode side, and this is extended and derived from the laminated film 29 which is a battery outer casing body. On the other hand, the negative electrode current collecting plate (negative electrode tab) 27 is disposed so as to be adjacent to the outermost layer current collector 11b on the negative electrode side, and is similarly extended and derived from the laminated film 29.

The number of times the single battery layer 19 is laminated is adjusted according to a desired voltage. Further, in the bipolar secondary battery 10, the number of times the single battery layer 19 is laminated may be reduced as long as a sufficient output can be secured even if the thickness of the battery is made as thin as possible. Even in the bipolar secondary battery 10, in order to prevent external impact and environmental deterioration during use, it is preferable to have a structure in which the power generating element 21 is vacuum-sealed in the laminated film 29 which is the battery outer casing body, and the positive electrode current collecting plate 25 and the negative electrode current collecting plate 27 are taken out from the laminated film 29. Although the embodiment of the present invention has been described here by taking a bipolar secondary battery as an example, the type of non-aqueous electrolyte battery to which the present invention can be applied is not particularly limited, and it can be applied to any known non-aqueous electrolyte secondary battery in the related art such as a so-called parallel laminate type battery in which single battery layers are connected in parallel in a power generating element.

Hereinafter, the main components of the above-mentioned bipolar secondary battery will be described.

[Current Collector]

The current collector has a function of mediating the movement of electrons from one surface in contact with the positive electrode active material layer to the other surface in contact with the negative electrode active material layer. The material constituting the current collector is not particularly limited, and for example, a metal or a resin having conductivity can be adopted.

Specific examples of the metal include aluminum, nickel, iron, stainless steel, titanium, copper, and the like. In addition to these, a clad material of nickel and aluminum, a clad material of copper and aluminum, a plating material of a combination of these metals, or the like, can be preferably used. Further, the metal may be a foil which has a metal surface coated with aluminum. Among them, aluminum, stainless steel, copper, and nickel are preferable from the viewpoints of electron conductivity, battery operating potential, adhesion of the negative electrode active material by sputtering to the current collector, and the like.

Further, examples of the latter resin having the conductivity include a resin in which a conductive filler is added to a non-conductive polymer material as needed.

Examples of the non-conductive polymer material include polyethylene (PE; high density polyethylene (HDPE), low density polyethylene (LDPE), or the like), polypropylene (PP), polyethylene terephthalate (PET), polyethernitrile (PEN), polyimide (PI), polyamide-imide (PAI), polyamide (PA), polytetrafluoroethylene (PTFE), styrene-butadiene rubber (SBR), polyacrylonitrile (PAN), polymethyl acrylate (PMA), polymethylmethacrylate (PMMA), polyvinyl chloride (PVC), polyvinylidene fluoride (PVdF), polystyrene (PS), and the like. Such a non-conductive polymer material can have excellent potential resistance or solvent resistance.

A conductive filler may be added to the above-mentioned conductive polymer material or non-conductive polymer material, if necessary. In particular, when the resin used as the base material of the current collector is formed of only a non-conductive polymer, a conductive filler is inevitably indispensable in order to impart conductivity to the resin.

The conductive filler can be used without particular limitation as long as it is a conductive material. For example, a material having excellent conductivity, potential resistance, or lithium ion blocking property includes metals, conductive carbon, and the like. The metal is not particularly limited, and preferably contains at least one metal selected from the group consisting of Ni, Ti, Al, Cu, Pt, Fe, Cr, Sn, Zn, In, and Sb, or an alloy containing these metals or a metal oxide. Further, the conductive carbon is not particularly limited. Preferably, it contains at least one selected from the group consisting of acetylene black, vulcan®, black pearl®, carbon nanofiber, Ketjen black®, carbon nanotube, carbon nanohorn, carbon nanoballoon, and fullerene.

The amount of the conductive filler added is not particularly limited as long as it can impart sufficient conductivity to the current collector, and is generally 5 to 80% by mass with respect to 100% by mass of the total mass of the current collector.

The current collector may have a single-layer structure made of a single material, or may have a laminated structure in which layers made of these materials are appropriately combined. From the viewpoint of reducing the weight of the current collector, it is preferable to include at least a conductive resin layer made of a resin having the conductivity. Further, from the viewpoint of blocking the movement of lithium ions between the single battery layers, a metal layer may be provided as a part of the current collector.

[Negative Electrode Active Material Layer]

The negative electrode active material layer contains a negative electrode active material. In the battery according to the present embodiment, the negative electrode active material contains composite secondary particles (hereinafter, also referred to as "composite secondary particles") in which the negative electrode active material particles including silicon-based negative electrode active material particles and carbon-based negative electrode active material particles are bound to each other via a binder.

<Composite Secondary Particles>

As described above, the composite secondary particles have a structure in which the negative electrode active material particles including the silicon-based negative electrode active material particles and the carbon-based negative electrode active material particles are bound to each other via a binder.

(Silicon-Based Negative Electrode Active Material Particles)

As the silicon-based negative electrode active material particles, known negative electrode active materials in the related art which contains silicon can be preferably used. Here, silicon belongs to a Group 14 element and is known to be a negative electrode active material that can greatly improve the capacity of a non-aqueous electrolyte secondary battery. Since a simple substance of silicon can occlude and release a large number of charge carriers (lithium ions and the like) per unit volume (mass), it becomes a high-capacity negative electrode active material. However, on the other hand, a non-aqueous electrolyte secondary battery using a silicon-based negative electrode active material may have relatively inferior rate characteristics. On the other hand, the non-aqueous electrolyte secondary battery using the carbon-based negative electrode active material described later has excellent rate characteristics. Therefore, by using both in combination as the negative electrode active material, the capacity of the non-aqueous electrolyte secondary battery can be increased, and excellent rate characteristics can be imparted to the non-aqueous electrolyte secondary battery.

Silicon has a large theoretical capacity when used as a negative electrode active material, but has a large volume change during charging and discharging. However, in the battery according to the present embodiment, by using the silicon-based negative electrode active material in the form of composite secondary particles, a device is provided to reduce the influence of the volume change during charging and discharging of the silicon-based negative electrode active material. Examples of the negative electrode active material containing a silicon element (silicon-based negative electrode active material) include a Si single substance. It is also preferable to use a silicon oxide such as $SiO_x$ ($0<x\leq2$) disproportionated into two phases, a Si phase and a silicon oxide phase, as the silicon-based negative electrode active material. The Si phase at $SiO_x$ can occlude and release lithium ions. This Si phase undergoes volume change (that is, expansion and contraction) with the occlusion and release of the lithium ions. On the other hand, the silicon oxide phase is formed of $SiO_2$ and the like, and the volume change due to charging and discharging is smaller than that of the Si phase. That is, $SiO_x$ as the negative electrode active material realizes a high capacity by the Si phase and suppresses the volume change of the entire negative electrode active material (or the negative electrode) by having the silicon oxide phase. The value of x is preferably 0.3 to 1.6. When x is 0.3 or more, the ratio of Si does not become excessive, the volume change during the charging and discharging can be sufficiently suppressed, and the cycle characteristics can be maintained well. On the other hand, when x is 1.6 or less, the Si ratio does not become excessively small, and the energy density can be maintained at a sufficiently high value. The range of x is more preferably $0.5\leq x\leq1.5$, and even more preferably $0.7\leq x\leq1.2$.

In the $SiO_x$ negative electrode active material, it is considered that an alloying reaction occurs between the lithium element and the silicon element contained in the Si phase during the charging and discharging of the non-aqueous electrolyte secondary battery, and this alloying reaction contributes to the charging and discharging of the non-aqueous electrolyte secondary battery (lithium ion secondary battery). Further, from the viewpoint of capacity characteristics and cycle durability, it is also preferable to use various silicon-containing alloys as the silicon-based negative electrode active material.

The average particle diameter of the silicon-based negative electrode active material particles is not particularly limited. However, a volume average particle diameter (D50) of the silicon-based negative electrode active material particles is preferably smaller than a volume average particle diameter (D50) of the carbon-based negative electrode active material particles described later. Specifically, the value of the ratio of the volume average particle diameter (D50) of the silicon-based negative electrode active material particles to the volume average particle diameter (D50) of the carbon-based negative electrode active material particles is preferably 0.001 to 0.1, and more preferably 0.005 to 0.05. If the value of the ratio is within this range, the discharge capacity of the negative electrode can be sufficiently improved. In this specification, the value of "volume average particle diameter (D50) of active material particles" means the value of 50% diameter in the volume-based integrated fraction obtained by a laser diffraction type measurement method. The value of the volume average particle diameter (D50) of the silicon-based negative electrode active material particles is preferably 0.05 to 2 μm and more preferably 0.1 to 1 μm, from the viewpoint of increasing the output and suppressing the volume change.

(Carbon-Based Negative Electrode Active Material Particles)

Examples of the carbon-based negative electrode active material particles include particles formed of a carbon material such as graphite (graphite), soft carbon (graphitizable carbon), or hard carbon (non-graphitizable carbon). In some cases, two or more types of carbon-based negative electrode active material particles may be used in combination. Among them, the carbon-based negative electrode active material particles preferably contain hard carbon. By the carbon-based negative electrode active material particles containing hard carbon, propylene carbonate, which is a solvent for a liquid electrolyte having excellent low-temperature characteristics, can be suitably used, and this point is also important from the viewpoint of the solvent blocking property of the resin current collector in the battery using the resin current collector described later. In addition, the use of hard carbon has an advantage in that a charging state can be easily detected even when the charging state (State Of Charge; SOC) is low. Needless to say, carbon-based negative electrode active material particles other than the above may be used.

The volume average particle diameter (D50) of the carbon-based negative electrode active material particles is not particularly limited, and is preferably 1 to 100 μm and more preferably 5 to 30 μm from the viewpoint of increasing the output.

In the composite secondary particles, negative electrode active material particles other than the above-mentioned silicon-based negative electrode active material particles and carbon-based negative electrode active material particles may be further composited as long as the action and effect of the present invention are not impaired. Examples of the constituent materials of the negative electrode active material particles that can be additionally composited include a tin-based negative electrode active material, a lithium-transition metal composite oxide (for example, $Li_4Ti_5O_{12}$), a lithium-alloy-based negative electrode material (for example, lithium-tin alloy, lithium-silicon alloy, lithium-aluminum alloy, lithium-aluminum-manganese alloy, or the like), and the like. However, in a preferable embodiment, the total mass of the silicon-based negative electrode active material particles and the carbon-based negative electrode active material particles in the negative electrode active material particles composited in the composite secondary particles is preferably 50% by mass or more, more preferably 80% by mass or more, even more preferably 90% by mass or more, particularly preferably 95% by mass or more, and most preferably 100% by mass. Further, the content ratio of the silicon-based negative electrode active material and the carbon-based negative electrode active material contained in the composite secondary particles is not particularly limited, and the mass ratio is preferably 10:1 to 1:10, more preferably 5:1 to 1:5, even more preferably 3:1 to 1:3, further more preferably 2:1 to 1:2, particularly preferably 1.5:1 to 1:1.5, and most preferably 1.2:1 to 1:1.2.

(Binder)

There is no particular limitation on the specific configuration of the binder used to bind the negative electrode active material particles including the silicon-based negative electrode active material particles and the carbon-based negative electrode active material particles to each other to form the composite secondary particles, and known materials in the related art which exhibit bonding property to the composited negative electrode active material particles can be preferably used.

Examples of such a binder include poly(meth)acrylic acid, carboxymethyl cellulose, polyvinyl alcohol, polyethylene oxide, and salts or derivatives of polymers thereof. Only one of the above-mentioned binders may be used alone, or two or more of them may be used in combination. Further, polyacrylic acid and polyvinyl alcohol may contain a structural unit other than the structural unit derived from acrylic acid or vinyl acetate that is an original structural unit in a range that does not adversely affect the present invention (for example, preferably 30 mol % or less, more preferably 20 mol % or less, still more preferably 10 mol % or less, and particularly preferably 5 mol % or less as the structural unit). Among these binders, poly(meth)acrylic acid and carboxymethyl cellulose are preferable, poly(meth)acrylic acid is particularly preferable, poly(meth)acrylic acid is particularly preferable, and polyacrylic acid is most preferable. Further, when the binder is a polymer having a carboxyl group, when the surface of the silicon-based negative electrode active material particles is exposed for some reason, it is also preferable that the binder can strongly interact with a silanol group (—SiOH group) which is considered to be present on the surface, and thus the active material particles can be stabilized.

In the battery according to the present embodiment, it is essential that the content of the binder in the composite secondary particles is 1% by mass or more with respect to the total mass of the negative electrode active material particles constituting the composite secondary particles. When the content of the binder contained in the composite secondary particles is excessively small, the silicon-based negative electrode active material particles and the carbon-based negative electrode active material particles cannot be sufficiently bound to each other, it may not be possible to sufficiently follow the carbon-based negative electrode active material after expansion and contraction of the silicon-based negative electrode active material. As a result, the electron conduction path in the negative electrode active material layer may be cut, and the cycle characteristics may be deteriorated. That is, from the viewpoint of sufficiently exhibiting the action and effect of the present invention of improving the cycle characteristics, the content of the binder in the composite secondary particles is essentially 1% by mass or more, preferably 3% by mass or more, more preferably 5% by mass or more, and even more preferably 8% by mass or more, with respect to the total mass of the negative electrode active material particles constituting the composite secondary particles. On the other hand, there is no particular limitation on the upper limit of the content of the binder in the composite secondary particles, and from the viewpoint of preventing a decrease in the battery capacity, it is preferably 20% by mass or less, and more preferably 10% by mass or less, with respect to the total mass of the negative electrode active material particles constituting the composite secondary particles.

(Producing Method of Composite Secondary Particles)

There is no particular limitation on the method for producing the composite secondary particles, and any method capable of binding the negative electrode active material particles including the silicon-based negative electrode active material and the carbon-based negative electrode active material to each other using a binder is employed. As an example, the negative electrode active material particles and the binder weighed in a predetermined compounding ratio are uniformly mixed in an appropriate solvent such as water, the solvent is dried, and then pulverization/classification or the like is performed as necessary so that composite secondary particles can be obtained. The particle diameter of the composite secondary particle thus obtained is not particularly limited, and is preferably 100 μm or less, and more preferably 75 μm or less from the viewpoint of preventing the electrode reaction from proceeding unevenly due to the mixing of coarse particles. On the other hand, the lower limit of the particle diameter of the composite secondary particles is preferably 0.02 μm or more, more preferably 10 μm or more, and even more preferably 20 μm or more.

<Components Other than Composite Secondary Particles>

The negative electrode active material layer may be formed of only composite secondary particles, or may further contain components other than the composite secondary particles. When the negative electrode active material layer further contains components other than the composite secondary particles, examples of the "components other than the composite secondary particles" include a negative electrode active material that is not in the form of composite secondary particles (not composited). The constituent material of the negative electrode active material that is not in the form of such composite secondary particles (not composited) is not particularly limited, and the constituent material of the negative electrode active material described above can be similarly employed. At this time, the total mass ratio of the negative electrode active material constituting the composite secondary particles contained in the negative electrode active material layer is preferably 10 to 100% by mass with respect to the total mass of the negative electrode active material. As described above, when the negative electrode active material contains 10% by mass or more of the negative electrode active material in the form of composite secondary particles in the negative electrode active material, the action and effect of the present invention can be sufficiently exhibited. In a preferable embodiment, the negative electrode active material layer includes hard carbon (non-graphitized carbon) that does not form composite secondary particles (is not bound to the silicon-based negative electrode active material via a binder). With such a configuration, it is possible to provide a battery having an excellent balance between high capacity and high cycle durability while suppressing deterioration of the cycle characteristics to the minimum. From the above, in a preferable embodiment of the negative electrode for a non-aqueous electrolyte secondary battery according to the present embodiment, the composite secondary particles have a particle diameter of 0.02 to 100 µm, and the content of the composite secondary particles contained in the negative electrode active material layer is 10 to 100% by mass with respect to the total mass of the negative electrode active material.

Further, the negative electrode active material layer may contain a conductive aid as a "component other than the composite secondary particles". Examples of the conductive aid include metals such as aluminum, stainless steel (SUS), silver, gold, copper, and titanium, alloys or metal oxides containing these metals; or carbon such as carbon fibers (specifically, vapor-grown carbon fiber (VGCF), polyacrylonitrile carbon fiber, pitch carbon fiber, rayon carbon fiber, activated carbon fiber, and the like), carbon nanotube (CNT), or carbon black (specifically, acetylene black, Ketjen black®, Furnace black, channel black, thermal lamp black, and the like), but is not limited to these. Further, a particulate ceramic material or a resin material coated with the above metal material by plating or the like can also be used as a conductive aid. Among these conductive aids, from the viewpoint of electrical stability, it is preferable to contain at least one selected from the group consisting of aluminum, stainless steel, silver, gold, copper, titanium, and carbon, more preferable to contain at least one selected from the group consisting of aluminum, stainless steel, silver, gold, and carbon, and even more preferable to contain at least one carbon. Only one of these conductive aids may be used alone, or two or more thereof may be used in combination.

The shape of the conductive aid is preferably particulate or fibrous. When the conductive aid is in the form of particles, the shape of the particles is not particularly limited, and may be any shape such as powder, sphere, rod, needle, plate, columnar, indefinite, flint, and spindle.

The average particle diameter (primary particle diameter) when the conductive aid is in the form of particles is not particularly limited, and is preferably 0.01 to 10 µm from the viewpoint of the electrical characteristics of the battery. In the present specification, the "particle diameter of the conductive aid" means the maximum distance L among the distances between any two points on the contour line of the conductive aid. As the value of "average particle diameter of conductive aid", the value calculated as the average value of the particle diameter of particles observed in several to several tens of fields using observation means such as a scanning electron microscope (SEM) or a transmission electron microscope (TEM) is employed.

When the negative electrode active material layer contains a conductive aid, the content of the conductive aid in the negative electrode active material layer is not particularly limited, and is preferably 2 to 10% by mass with respect to the total mass of the negative electrode active material layer, more preferably 4 to 8% by mass, and even more preferably 5 to 7% by mass. Within such a range, it is possible to form a stronger electron conduction path in the negative electrode active material layer, and it is possible to effectively contribute to the improvement of the cycle characteristics.

In addition to those described above, the negative electrode active material layer may further contain an ion conductive polymer, a lithium salt, or the like. Examples of the ion conductive polymer include polyethylene oxide (PEO)-based and polypropylene oxide (PPO)-based polymers. Examples of the lithium salts include lithium salts of inorganic acids such as $LiPF_6$, $LiBF_4$, $LiSbF_6$, $LiAsF_6$, $LiClO_4$, and $LiN(FSO_2)_2$, lithium salts of organic acids such as $LiN(CF_3SO_2)_2$, $LiN(C_2F_5SO_2)_2$, and $LiC(CF_3SO_2)_3$, and the like. Among these, $LiPF_6$ or $LiN(FSO_2)_2$ is preferable from the viewpoint of battery output and charge and discharge cycle characteristics.

Further, in the battery according to the present embodiment, from the viewpoint of improving the energy density of the battery, it is preferable that the content of the member that does not contribute to the progress of the charge and discharge reaction is small. For example, it is preferable not to use a binder as much as possible, which is added to maintain the structure of the negative electrode active material layer by binding composite secondary particles, other negative electrode active material particles contained as necessary, and additives such as a conductive aid to each other. That is, in a preferable embodiment of the battery according to the present embodiment, the negative electrode active material layer (and the positive electrode active material layer described later) is a so-called "non-bound body" in which all of the constituent materials (the composite secondary particles and the like in the negative electrode active material layer) are not bound to each other via a binder. At this time, the content of the binder in the negative electrode active material layer (and the positive electrode active material layer described later) is preferably 1% by mass or less, more preferably 0.5% by mass or less, even more preferably 0.2% by mass or less, particularly preferably 0.1% by mass or less, and most preferably 0% by mass, with respect to 100% by mass of the total solid content contained in the electrode active material layer. With such a configuration, a heating and drying step of binding the active material with the binder can be omitted, and the occurrence of cracks in the electrode active material layer can be prevented. Further, by suppressing the content of the binder, it is possible to obtain a battery having a high capacity (that is, a high energy density). The binder of any component used in the negative electrode active material layer is not particularly limited, and examples thereof include the following materials.

Examples thereof include thermoplastic polymers such as polybutylene terephthalate, polyethylene terephthalate, polyvinylidene fluoride (PVDF) (including compounds in which hydrogen atoms are substituted with other halogen elements), polyethylene, polypropylene, polymethylpentene, polybutene, polyethernitrile, polytetrafluoroethylene, polyacrylonitrile, polyimide, polyamide, an ethylene-vinyl acetate copolymer, polyvinyl chloride, styrene-butadiene rubber (SBR), an ethylene-propylene-diene copolymer, a styrene-butadiene-styrene block copolymer and a hydrogen additive thereof, and a styrene/isoprene/styrene block copolymer and a hydrogenated additive thereof; fluororesins such as a tetrafluoroethylene/hexafluoropropylene copolymer (FEP), a tetrafluoroethylene/perfluoroalkyl vinyl ether copolymer (PFA), an ethylene/tetrafluoroethylene copolymer (ETFE), polychlorotrifluoroethylene (PCTFE), an ethylene/chlorotrifluoroethylene copolymer (ECTFE), and polyvinyl fluoride (PVF); vinylidene fluoride fluororubber such as vinylidene fluoride-hexafluoropropylene fluororubber (VDF-HFP Fluororubber), vinylidene fluoride-hexafluoropropylene-tetrafluoroethylene fluororubber (VDF-HFP-TFE Fluororubber), vinylidene fluoride-pentafluoropropylene fluororubber (VDF-PFP Fluororubber), vinylidene fluoride-pentafluoropropylene-tetrafluoroethylene fluororubber (VDF-PFP-TFE Fluororubber), vinylidene fluoride-perfluoromethyl vinyl ether-tetrafluoroethylene fluororubber (VDF-PFMVE-TFE Fluororubber), and vinylidene fluoride-chlorotrifluoroethylene fluororubber (VDF-CTFE fluororubber); epoxy resins; and the like. Among these, polyimide, styrene-butadiene rubber, carboxymethyl cellulose, polypropylene, polytetrafluoroethylene, polyacrylonitrile, and polyamide are more preferable.

In the battery according to the present embodiment, the thickness of the negative electrode active material layer is not particularly limited, and is preferably 200 μm or more. With such a configuration, the energy density of the battery can be sufficiently increased. The thickness of the negative electrode active material layer is preferably 200 to 1500 μm, more preferably 210 to 1200 μm, and further preferably 220 to 1000 μm. When the thickness of the negative electrode active material layer is a value equal to or more than the above-mentioned lower limit value, the energy density of the battery can be sufficiently increased. On the other hand, when the thickness of the negative electrode active material layer is a value equal to or lower than the above-mentioned upper limit value, the structure of the negative electrode active material layer can be sufficiently maintained.

(Method of Producing Negative Electrode)

A method of producing a negative electrode is not particularly limited, and except for the use of the above-mentioned predetermined composite secondary particles, other negative electrode active material particles used as necessary, and additives such as a conductive aid, a known method in the related art such as a method of applying the slurry prepared using an appropriate solvent to the surface of a current collector and drying the slurry can be appropriately referred to. At this time, from the viewpoint of reducing the internal resistance of the obtained battery and improving the output characteristics of the battery, it is preferable to perform a treatment such as vacuum drying on each material before preparing the slurry to remove the contained moisture.

[Positive Electrode Active Material Layer]

The positive electrode active material layer contains a positive electrode active material.

(Positive Electrode Active Material)

Examples of the positive electrode active material include a lithium-transition metal composite oxide such as $LiMn_2O_4$, $LiCoO_2$, $LiNiO_2$, $Li(Ni-Mn-Co)O_2$, and some of these transition metals are substituted with other elements, a lithium-transition metal phosphate compound, a lithium-transition metal sulfate compound, and the like, for example. In some cases, two or more types of positive electrode active materials may be used in combination. Preferably, a lithium-transition metal composite oxide is used as the positive electrode active material from the viewpoint of capacity and output characteristics. More preferably, a composite oxide containing lithium and nickel is used, and even more preferably, $Li(Ni-Mn-Co)O_2$ and some of these transition metals substituted with other elements (hereinafter, simply referred to as "NMC composite oxide") are used. The NMC composite oxide has a layered crystal structure in which lithium atomic layers and transition metal (Mn, Ni and Co are arranged in an orderly manner) atomic layers are alternately stacked via an oxygen atomic layer, in which one Li atom is contained in each atom of the transition metal M, and the amount of Li that can be taken out is twice that of the spinel-based lithium manganese oxide, that is, the supply capacity is doubled, and a high capacity can be obtained.

As described above, the NMC composite oxide also includes a composite oxide in which some of the transition metal elements are substituted with other metal elements. Examples of other elements in that case include Ti, Zr, Nb, W, P, Al, Mg, V, Ca, Sr, Cr, Fe, B, Ga, In, Si, Mo, Y, Sn, V, Cu, Ag, Zn, and the like, and preferably Ti, Zr, Nb, W, P, Al, Mg, V, Ca, Sr, and Cr, more preferably Ti, Zr, P, Al, Mg, and Cr, and even more preferably Ti, Zr, Al, Mg, and Cr from the viewpoint of improving cycle characteristics.

Since the NMC composite oxide has a high theoretical discharge capacity, it preferably has a composition represented by General Formula (1): $Li_aNi_bMn_cCo_dM_xO_2$ (here, a, b, c, d, and x in the formula is $0.9 \leq a \leq 1.2$, $0 < b < 1$, $0 < c \leq 0.5$, $0 < d \leq 0.5$, $0 \leq x \leq 0.3$, and $b+c+d=1$ are satisfied. M is at least one kind selected from Ti, Zr, Nb, W, P, Al, Mg, V, Ca, Sr, and Cr). Here, a represents an atomic ratio of Li, b represents an atomic ratio of Ni, c represents an atomic ratio of Mn, d represents an atomic ratio of Co, and x represents an atomic ratio of M. From the viewpoint of the cycle characteristics, it is preferable that $0.4 \leq b \leq 0.6$ in General Formula (1). The composition of each element can be measured by, for example, plasma (ICP) emission spectrometry.

In general, nickel (Ni), cobalt (Co), and manganese (Mn) are known to contribute to capacity and output characteristics from the viewpoint of improving material purity and electron conductivity. Ti and the like partially substitute some of the transition metals in the crystal lattice. From the viewpoint of the cycle characteristics, it is preferable that some of the transition elements are substituted with other metal elements, and it is particularly preferable that $0 < x \leq 0.3$ in General Formula (1). At least one selected from the group consisting of Ti, Zr, Nb, W, P, Al, Mg, V, Ca, Sr, and Cr is solid-solved to stabilize the crystal structure, as a result, it is considered that the capacity of the battery can be prevented from decreasing even if charging and discharging are repeated, and the excellent cycle characteristics can be realized.

As a more preferable embodiment, in General Formula (1), it is preferable that b, c, and d are $0.44 \leq b \leq 0.51$, $0.27 \leq c \leq 0.31$, and $0.19 \leq d \leq 0.26$, from the viewpoint of improving the balance between the capacity and life characteristics. For example, $LiNi_{0.5}Mn_{0.3}Co_{0.2}O_2$ has the advantage in that a compact and high-capacity battery can be produced by having a large capacity per unit weight and being able to improve the energy density, as compared to $LiCoO_2$, $LiMn_2O_4$, $LiNi_{1/3}Mn_{1/3}Co_{1/3}O_2$, and the like, which have a proven track record in general consumer batteries, which is also preferable from the viewpoint of cruising distance. $LiNi_{0.8}Co_{0.1}Al_{0.1}O_2$ is more advantageous in that it has a larger capacity. On the other hand, $LiNi_{0.5}Mn_{0.3}Co_{0.2}O_2$ has excellent life characteristics comparable to $LiNi_{1/3}Mn_{1/3}Co_{1/3}O_2$.

In some cases, two or more types of positive electrode active materials may be used in combination. Preferably, a lithium-transition metal composite oxide is used as the positive electrode active material from the viewpoint of capacity and output characteristics. Needless to say, a positive electrode active material other than the above may be used.

The average particle diameter of the positive electrode active material contained in the positive electrode active material layer is not particularly limited, and is preferably 1 to 30 μm and more preferably 5 to 20 μm from the viewpoint of increasing the output.

Further, the positive electrode active material layer 13 further contains other additives such as a conductive aid, a conductive member, and a binder, as required, in the same manner as described above for the negative electrode active material layer 15. However, similar to the negative electrode active material layer 15 described above, it is preferable that the positive electrode active material layer 13 of the non-aqueous electrolyte secondary battery according to the present embodiment also contains no binder. That is, in a preferable embodiment of the non-aqueous electrolyte secondary battery according to the present embodiment, the positive electrode active material layer is a so-called "non-bound body" in which the positive electrode active material is not bound by a binder. At this time, the content of the binder in the positive electrode active material layer is preferably 1% by mass or less, more preferably 0.5% by mass or less, even more preferably 0.2% by mass or less, particularly preferably 0.1% by mass or less, and most preferably 0% by mass, with respect to 100% by mass of the total solid content contained in the positive electrode active material layer.

The positive electrode (positive electrode active material layer) can be formed by any of a sputtering method, a vapor deposition method, a CVD method, a PVD method, an ion plating method, and a thermal spraying method, in addition to the usual method of applying (coating) a slurry.

[Electrolyte Layer]

The electrolyte layer of the non-aqueous electrolyte secondary battery according to the present embodiment is disposed between the positive electrode and the negative electrode and has a configuration in which the electrolyte is held by a separator. The electrolyte used for the electrolyte layer of the present embodiment is not particularly limited, and a liquid electrolyte, a gel polymer electrolyte, or an ion liquid electrolyte is used without limitation. By using these electrolytes, high lithium ion conductivity can be secured.

The liquid electrolyte has a function as a carrier of lithium ions. The liquid electrolyte constituting the electrolyte solution layer has a form in which a lithium salt is dissolved in an organic solvent. Examples of the organic solvent used include carbonates such as ethylene carbonate (EC), propylene carbonate (PC), dimethyl carbonate (DMC), diethyl carbonate (DEC), and ethyl methyl carbonate. As the lithium salt, compounds such as $Li(C_2F_5SO_2)_2N$, $LiPF_6$, $LiBF_4$, $LiClO_4$, $LiAsF_6$, and $LiCF_3SO_3$ that can be added to the active material layer of the electrode can be similarly employed. The liquid electrolyte may further contain additives other than the above-mentioned components. Specific examples of such compounds include fluoroethylene carbonate, vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinyl ethylene carbonate, 1-methyl-1-vinyl ethylene carbonate, 1-methyl-2-vinyl ethylene carbonate, 1-ethyl-1-vinyl ethylene carbonate, 1-ethyl-2-vinyl ethylene carbonate, vinyl vinylene carbonate, allylethylene carbonate, vinyloxymethylethylene carbonate, allyloxymethylethylene carbonate, acrylicoxymethylethylene carbonate, methacryloxymethylethylene carbonate, ethynylethylene carbonate, propargylethylene carbonate, ethynyloxymethylethylene carbonate, propargyloxyethylene carbonate, methyleneethylene carbonate, 1,1-dimethyl-2-methyleneethylene carbonate, and the like. Among these, fluoroethylene carbonate, vinylene carbonate, methylvinylene carbonate, and vinylethylene carbonate are preferable, and fluoroethylene carbonate, vinylene carbonate, and vinylethylene carbonate are more preferable. Only one of these cyclic carbonates may be used alone, or two or more of them may be used in combination. The concentration of the lithium salt in the liquid electrolyte is preferably 0.1 to 3.0 M, and more preferably 0.8 to 2.2 M. When the additive is used, the amount used is preferably 0.5 to 10% by mass and more preferably 0.5 to 5% by mass, with respect to 100% by mass of the electrolyte solution before the additive is added.

The gel polymer electrolyte has a configuration in which the above liquid electrolyte is injected into a matrix polymer (host polymer) formed of an ion conductive polymer. As the electrolyte, the gel polymer electrolyte is excellent in that by using the gel polymer electrolyte, the fluidity of the electrolyte is lost, and it becomes easy to block the ion conductivity between the layers. Examples of the ion conductive polymer used as the matrix polymer (host polymer) include polyethylene oxide (PEO), polypropylene oxide (PPO), polyethylene glycol (PEG), polyacrylonitrile (PAN), and polyvinylidene fluoride-hexafluoropropylene (PVdF-HEP), polymethyl methacrylate (PMMA), and copolymers thereof and the like.

The matrix polymer of the gel polymer electrolyte can exhibit excellent mechanical strength by forming a crosslinked structure. In order to form the crosslinked structure, a suitable polymerization initiator is used, and a polymerizable polymer for polymer electrolyte formation (for example, PEO or PPO) may be subjected to polymerization such as thermal polymerization, ultraviolet polymerization, radiation polymerization, electron beam polymerization, or the like.

The ion liquid electrolyte is a solution of a lithium salt in an ion liquid. The ion liquid is a salt consisting of only cations and anions, which refers to a series of compounds that are liquid at room temperature.

The cation components forming the ion liquid are preferably at least one selected from the group of substituted or unsubstituted imidazolium ions, substituted or unsubstituted pyridinium ions, substituted or unsubstituted pyrrolium ions, substituted or unsubstituted pyrazolium ions, substituted or unsubstituted pyrrolinium ion, substituted or unsubstituted pyrrolidinium ions, substituted or unsubstituted piperidinium ions, substituted or unsubstituted triadinium ions, and substituted or unsubstituted ammonium ions.

Specific examples of the anion component constituting the ion liquid include halide ions such as a fluoride ion, a chloride ion, a bromide ion, and an iodide ion, a nitrate ion $(NO_3^-)$, a tetrafluoroborate ion $(BF_4^-)$, a hexafluorophosphate ion $(PF_6^-)$, $(FSO_2)_2N^-$, $AlCl_3^-$, a lactate ion, an acetate ion $(CH_3COO^-)$, a trifluoroacetate ion $(CF_3COO^-)$, a methanesulfonate ion $(CH_3SO_3^-)$, a trifluoromethanesulfonate ion $(CF_3SO_3^-)$, a bis(trifluoromethanesulfonyl) imide ion $((CF_3SO_2)_2N^-)$, a bis(pentafluoroethylsulfonyl) imide ion $((C_2F_5SO_2)_2N^-)$, $BF_3C_2F_5^-$, a tris(trifluoromethanesulfonyl) carbonate ion $((CF_3SO_2)_3C^-)$, a perchlorate ion $(ClO_4^-)$, a dicyanamide ion $((CN)_2N^-)$, an organic sulfate ion, an organic sulfonic acid ion, $R^1COO^-$, $HOOCR^1COO^-$, $^-OOCR^1COO^-$, $NH_2CHR^1COO^-$ (at this time, $R^1$ is a substituent, which is an aliphatic hydrocarbon group, an alicyclic hydrocarbon group, an aromatic hydrocarbon group, an ether group, an ester group, or an acyl group, and the above-mentioned substituent may contain a fluorine atom), or the like.

Examples of preferable ion liquids include 1-methyl-3-methylimidazolium bis(trifluoromethanesulfonyl) imide and N-methyl-N-propylpyrrolidium bis(trifluoromethanesulfonyl) imide. Only one of these ion liquids may be used alone, or two or more of them may be used in combination. The lithium salt used for the ion liquid electrolyte is the same as the lithium salt used for the above-mentioned liquid electrolyte.

Further, the following additives may be added to the ion liquid. The inclusion of additives can further improve charge and discharge characteristics and cycle characteristics at high rates. Specific examples of the additive include fluoroethylene carbonate, vinylene carbonate, ethylene carbonate, propylene carbonate, γ-butyl lactone, γ-valerolactone, methyl diglime, sulfolane, trimethyl phosphate, triethyl phosphate, methoxymethylethyl carbonate, fluorinated ethylene carbonate, and the like. These may be used either singly or in combination of two or more types.

Examples of the form of the separator include a porous sheet separator made of a polymer or fiber that absorbs and retains the electrolyte, a non-woven fabric separator, and the like.

As the separator of the porous sheet made of polymer or fibers, for example, microporous (microporous membrane) can be used. Specific forms of the porous sheet made of the polymers or fibers include microporous (microporous membrane) separator made of, for example, polyolefin such as polyethylene (PE) and polypropylene (PP); a laminate in which a plurality of these are laminated (for example, three layers of PP/PE/PP, or the like), hydrocarbon resins such as polyimide, aramid, and polyvinylidene fluoride-hexafluoropropylene (PVdF-HFP), glass fibers, and the like.

The thickness of the microporous (microporous membrane) separator cannot be uniquely specified because it differs depending on the intended use. For example, in applications of a secondary battery for motor driving or the like such as electric vehicles (EV), hybrid electric vehicles (HEV), fuel cell vehicles (FCV), and the like, it is desirable that the thickness is 4 to 60 μm in a single layer or multiple layers. It is desirable that the micropore size of the microporous (microporous membrane) separator is 1 μm or less (usually, a pore size of several tens of nm) at the maximum.

As the non-woven fabric separator, known ones in the related art such as cotton, rayon, acetate, nylon, polyester; polyolefin such as PP and PE; polyimide and aramid are used alone or in combination. Further, the bulk density of the non-woven fabric is not particularly limited as long as sufficient battery characteristics can be obtained by the impregnated polymer gel electrolyte. Further, the thickness of the non-woven fabric separator may be the same as that of the electrolyte layer, and is preferably 5 to 200 μm, and particularly preferably 10 to 100 μm.

Further, the separator is preferably a separator in which a heat resistant insulating layer is laminated on a porous substrate (separator with a heat resistant insulating layer). The heat resistant insulating layer is a ceramic layer containing inorganic particles and a binder. The separator with a heat resistant insulating layer has high heat resistance, having a melting point or a thermal softening point of 150° C. or higher, preferably 200° C. or higher. By having the heat resistant insulating layer, the internal stress of the separator, which increases when the temperature rises, is relaxed, so that the effect of suppressing thermal shrinkage can be obtained. As a result, it is possible to prevent the induction of a short circuit between the electrodes of the battery, so that the battery configuration is less likely to cause performance deterioration due to a temperature rise. Further, by having the heat resistant insulating layer, the mechanical strength of the separator with a heat resistant insulating layer is improved, and the film breakage of the separator is less likely to occur. Further, due to the effect of suppressing thermal shrinkage and high mechanical strength, the separator is less likely to curl in a battery producing step.

The inorganic particles in the heat resistant insulating layer contribute to the effect of the mechanical strength and suppressing thermal shrinkage of the heat resistant insulating layer. The material used as the inorganic particles is not particularly limited. Examples thereof include silicon, aluminum, zirconium, and titanium oxides ($SiO_2$, $Al_2O_3$, $ZrO_2$, $TiO_2$), hydroxides, and nitrides, and composites thereof. These inorganic particles may be derived from mineral resources such as boehmite, zeolite, apatite, kaolin, mullite, spinel, olivine, and mica, or may be artificially produced. In addition, only one of these inorganic particles may be used alone, or two or more of them may be used in combination. Among these, from the viewpoint of cost, it is preferable to use silica ($SiO_2$) or alumina ($Al_2O_3$), and it is more preferable to use alumina ($Al_2O_3$).

The basis weight of heat-resistant particles is not particularly limited, and is preferably 5 to 15 $g/m^2$. Within this range, sufficient ion conductivity can be obtained and heat resistance is maintained, which is preferable.

The binder in the heat resistant insulating layer has a role of adhering the inorganic particles to each other and adhering the inorganic particles and the resin porous base layer. The binder stably forms the heat resistant insulating layer and prevents peeling between the porous substrate layer and the heat resistant insulating layer.

The binder used for the heat resistant insulating layer is not particularly limited, and for example, carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), methyl acrylate and the like can be used as binders. Among these, carboxymethyl cellulose (CMC), methyl acrylate, or polyvinylidene fluoride (PVDF) is preferably used. Only one of these compounds may be used alone, or two or more of them may be used in combination.

The content of the binder in the heat resistant insulating layer is preferably 2 to 20% by weight with respect to 100% by weight of the heat resistant insulating layer. When the content of the binder is 2% by weight or more, the peel strength between the heat resistant insulating layer and the porous substrate layer can be increased, and the vibration resistance of the separator can be improved. On the other hand, when the content of the binder is 20% by weight or less, the gaps between the inorganic particles are appropriately maintained, so that sufficient lithium ion conductivity can be ensured.

The heat shrinkage of the separator with a heat resistant insulating layer is preferably 10% or less for both MD and TD after holding for 1 hour under the conditions of 150° C. and 2 $gf/cm^2$. By using such a material having high heat resistance, it is possible to effectively prevent the separator from shrinking even when the heat generation amount becomes high and the battery internal temperature reaches 150° C. As a result, it is possible to prevent the induction of a short circuit between the electrodes of the battery, so that the battery configuration is less likely to cause performance deterioration due to a temperature rise.

[Positive Electrode Current Collecting Plate and Negative Electrode Current Collecting Plate]

The material constituting current collecting plates (25, 27) is not particularly limited, and a known highly conductive material used in the related art as a current collecting plate for a lithium ion secondary battery can be used. As the constituent material of the current collecting plate, for example, metal materials such as aluminum, copper, titanium, nickel, stainless steel (SUS), and alloys thereof are preferable. From the viewpoint of light weight, corrosion resistance, and high conductivity, aluminum and copper are more preferable, and aluminum is particularly preferable. The same material may be used or different materials may be used for the positive electrode current collecting plate 25 and the negative electrode current collecting plate 27.

[Positive Electrode Lead and Negative Electrode Lead]

Further, although not shown, the current collector 11 and the current collecting plates (25, 27) may be electrically connected to each other via a positive electrode lead or a negative electrode lead. As the constituent materials of the positive electrode lead and the negative electrode lead, materials used in known lithium ion secondary batteries can be similarly employed. A part taken out from the exterior is preferably covered with a heat-resistant heat-shrinkable tube or the like so as to prevent the product (for example, automobile parts, particularly, electronic devices or the like) from being affected by electric leakage due to contact with peripheral devices, wiring, or the like.

[Seal Portion]

A seal portion (insulating layer) has a function of preventing contact between current collectors and a short circuit at the end of the single battery layer. The material constituting the sealing portion may be any material as long as it has insulating property, sealing property against falling off of a solid electrolyte, sealing property against moisture permeation from the outside (sealing property), heat resistance under battery operating temperature, and the like. For example, an acrylic resin, a urethane resin, an epoxy resin, a polyethylene resin, a polypropylene resin, a polyimide resin, rubber (ethylene-propylene-diene rubber: EPDM), and the like can be used. Further, an isocyanate-based adhesive, an acrylic resin-based adhesive, a cyanoacrylate-based adhesive, or the like may be used, or a hot melt adhesive (urethane resin, polyamide resin, and polyolefin resin) or the like may be used. Among them, from the viewpoints of corrosion resistance, chemical resistance, ease of production (film formation), economy, and the like, a polyethylene resin and a polypropylene resin are preferably used as constituent materials of the insulating layer, and resins obtained by copolymerizing ethylene, propylene, and butene containing a non-crystalline polypropylene resin as a main component are preferably used.

[Battery Outer Casing Body]

As the battery outer casing body, a known metal can case can be used, or a bag-shaped case using a laminated film 29 containing aluminum, which can cover the power generating element as illustrated in FIG. 1, can be used. As the laminated film, for example, a laminated film having a three-layer structure in which PP, aluminum, and nylon are laminated in this order can be used, or the like, but the laminated film is not limited thereto. Laminated films are desirable from the viewpoint of high output and excellent cooling performance, and can be suitably used for batteries for large devices for EVs and HEVs. Further, the outer casing body is more preferably a laminated film containing aluminum from the fact that a group pressure applied to the power generating element from the outside can be easily adjusted.

The bipolar secondary battery of the present embodiment can improve the output characteristics at a high rate by forming the above-mentioned negative electrode active material layer. Therefore, the bipolar secondary battery of the present embodiment is suitably used as a power source for driving EVs and HEVs.

[Cell Size]

Figure 2:
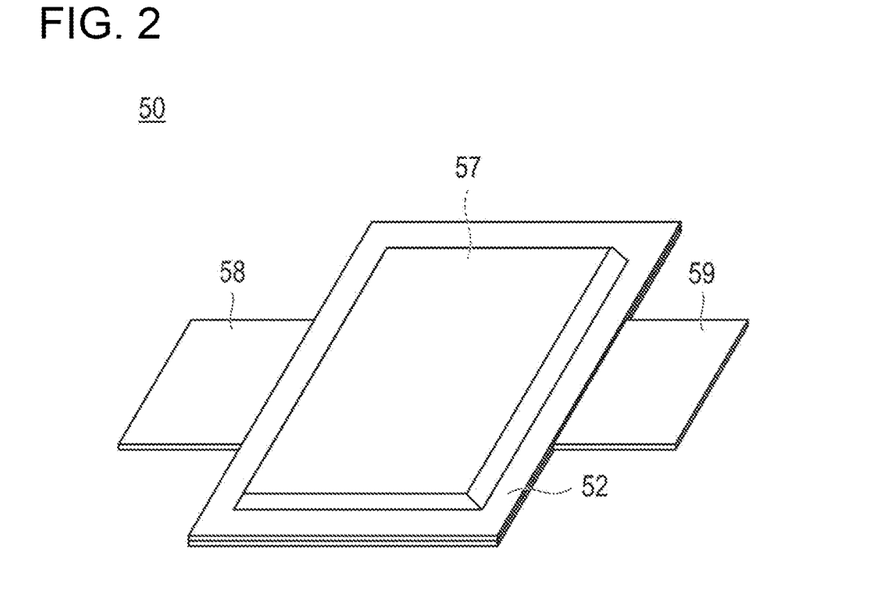
FIG. 2 is a perspective view illustrating an outer appearance of a flat lithium ion secondary battery, which is a representative embodiment of a secondary battery.

FIG. 2 is a perspective view illustrating an outer appearance of a flat lithium ion secondary battery, which is a representative embodiment of a secondary battery.

As illustrated in FIG. 2, a flat bipolar secondary battery 50 has a rectangular flat shape, and positive electrode tabs 58 and negative electrode tabs 59 for extracting electric power are pulled out from both side portions thereof. The power generating element 57 is wrapped by the battery outer casing body (laminated film 52) of the bipolar secondary battery 50, and the surroundings thereof are heat-sealed. The power generating element 57 is sealed in a state where the positive electrode tab 58 and the negative electrode tab 59 are pulled out to the outside. Here, the power generating element 57 corresponds to the power generating element 21 of the bipolar secondary battery 10 illustrated in FIG. 1 described above. The power generating element 57 is formed by stacking a plurality of bipolar electrodes 23 via an electrolyte layer 17.

The lithium ion secondary battery is not limited to a laminated flat battery. The shape of winding type lithium ion secondary battery is not particularly limited and may have a cylindrical shape, or may be formed by deforming such a cylindrical shape into a rectangular flat shape, for example. The cylindrical shape is not particularly limited, for example, a laminated film may be used for the outer casing body, or a cylindrical can (metal can) in the related art may be used. Preferably, the power generating element is exteriorized with an aluminum laminated film. By this form, weight reduction can be achieved.

Further, the extraction of the tabs 58 and 59 illustrated in FIG. 2 is not particularly limited. The positive electrode tab 58 and the negative electrode tab 59 are not limited as illustrated in FIG. 2, and may be pulled out from the same side, or the positive electrode tab 58 and the negative electrode tab 59 may be divided into a plurality of each and taken out from each side, for example. Further, in the winding type lithium ion battery, a terminal may be formed by using, for example, a cylindrical can (metal can) instead of the tab.

In general electric vehicles, a battery storage space is about 170 L. Since the cell and auxiliary equipment such as charge and discharge control equipment are stored in this space, generally the storage space efficiency of the cell is about 50%. The loading efficiency of cells in this space is a factor that controls the cruising distance of electric vehicles. If the size of the single cell becomes small, the above loading efficiency is impaired, so that the cruising distance cannot be secured.

Therefore, in the present invention, it is preferable that the battery structure in which the power generating element is covered with the outer casing body is large. Specifically, the length of the short side of the laminated cell battery is preferably 100 mm or more. Such large batteries can be used in vehicle applications. Here, the length of the short side of the laminated cell battery refers to the side having the shortest side. The upper limit of the length of the short side is not particularly limited, and is usually 400 mm or less.

[Volume Energy Density and Rated Discharge Capacity]

In general electric vehicles, how to lengthen the mileage (cruising distance) by one charge is an important development goal. When considering these points, the volume energy density of the battery is preferably 157 Wh/L or more, and the rated capacity is preferably 20 Wh or more.

Further, from the viewpoint of a large-sized battery, which is different from the viewpoint of the physical size of the electrode, it is possible to specify the increase in size of the battery in relation to the battery area and the battery capacity. For example, in a case of a flat laminated battery, the present invention is preferably applied to the battery in which the value of the ratio of the battery area (projected area of the battery including the battery outer casing body) to the rated capacity is 5 cm$^2$/Ah or more, and the rated capacity is 3 Ah or more.

[Assembled Battery]

An assembled battery is formed by connecting a plurality of batteries. More specifically, it is formed by serialization, parallelization, or both, using at least two or more batteries. By serializing and parallelizing the batteries, the capacitance and voltage can be adjusted freely.

It is also possible to connect a plurality of batteries in series or in parallel to form a small assembled battery that can be attached/detached. Then, by connecting a plurality of these detachable small assembled batteries that can be attached/detached in series or in parallel, it is also possible to form an assembled battery having a large capacity and a large output suitable for a vehicle driving power source or an auxiliary power source that require a high volume energy density and a high volume output density. How many batteries are connected to produce an assembled battery, or how many stages of small assembled batteries are stacked to produce a large-capacity assembled battery may be determined depending on the battery capacity and the output of the vehicle (electric vehicle) to be installed.

[Vehicle]

The non-aqueous electrolyte secondary battery of the present embodiment maintains the discharge capacity even after long-term use and has good cycle characteristics. In addition, the volume energy density is high. In vehicle applications such as electric vehicles, hybrid electric vehicles, fuel cell vehicles, and hybrid fuel cell vehicles, higher capacity and larger size are required and longer life is required compared to electric and portable electronic device applications. Therefore, the non-aqueous electrolyte secondary battery can be suitably used as a power source for a vehicle, for example, a vehicle drive power source or an auxiliary power source.

Specifically, a battery or an assembled battery formed by combining a plurality of batteries can be mounted on the vehicle. In the present invention, a long-life battery having excellent long-term reliability and output characteristics can be configured. Therefore, when such a battery is installed, a plug-in hybrid electric vehicle having a long EV mileage or an electric vehicle having a long one-charge mileage can be configured. This is because, for example, in a case of automobiles, a battery or an assembled battery formed by combining a plurality of these batteries can be used in a hybrid vehicle, a fuel cell vehicle, or an electric vehicle (all include four-wheeled vehicles (passenger cars, trucks, commercial vehicles such as buses, light vehicles, or the like), as well as two-wheeled vehicles (motorcycles) and tricycles) to obtain a vehicle having a long life and high reliability.

However, the application is not limited to automobiles, and for example, it can be applied to various power sources of other vehicles, for example, mobile bodies such as trains, and can also be used as a mounting power source for an uninterruptible power system or the like.

EXAMPLES

Hereinafter, the present invention will be described in more detail with reference to Examples. Here, the technical scope of the present invention is not limited to the following examples. Unless otherwise specified, "part" means "part by mass". In addition, all the steps up to the production of the non-aqueous electrolyte secondary battery were carried out in the dry room.

Production Example of Composite Particle

Production Example 1 of Composite Secondary Particle

Figure 3:
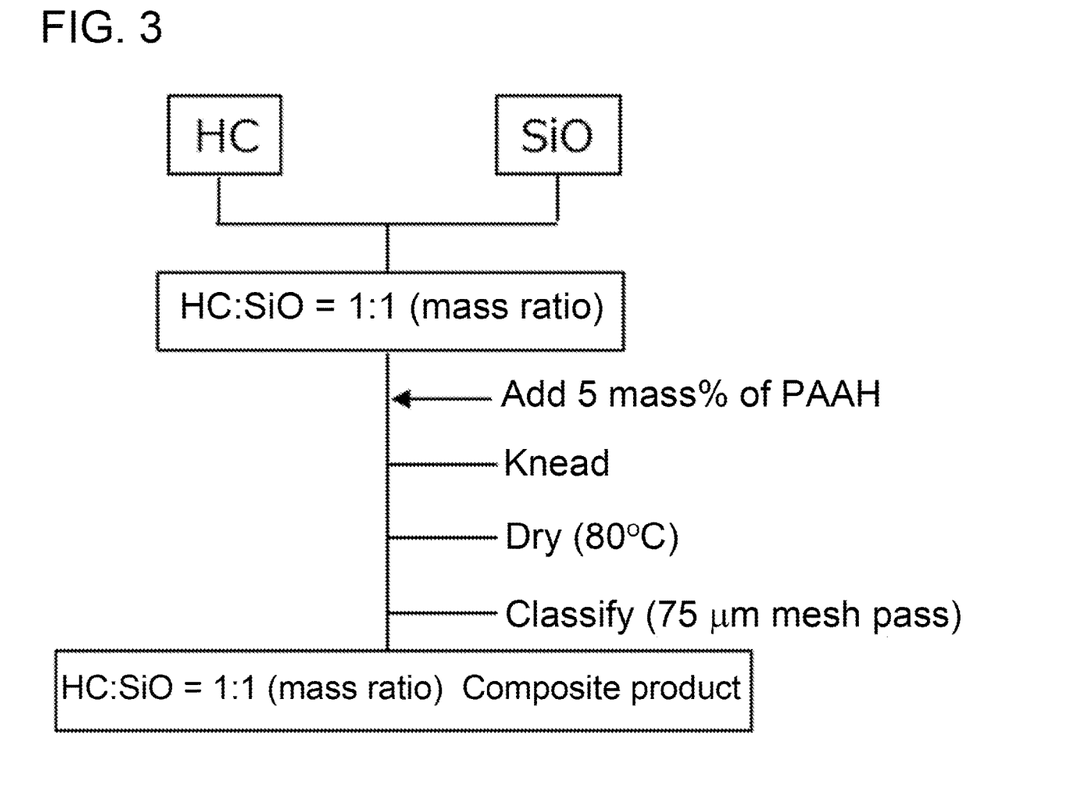
FIG. 3 is a flow chart illustrating a procedure for producing composite secondary particles in a column of Examples described later.

Composite secondary particles were produced according to the flow as illustrated in FIG. 3.

Specifically, first, as the negative electrode active material, hard carbon (HC; non-graphitized carbon) powder (CARBOTRON (registered trademark) PS (F) available from Kureha Battery Materials Japan Co., Ltd., volume average particle diameter (D50)=20 μm)) and SiO powder (available from OSAKA Titanium technologies Co., Ltd, volume average particle diameter (D50)=1 μm) were weighed at equal masses and mixed to obtain an active material mixture. An aqueous polyacrylic acid solution (PAAH; concentration 35% by mass) containing polyacrylic acid as a binder was added to the obtained active material mixture so that the amount of polyacrylic acid (solid content) added is 5% by mass with respect to the mass (100% by mass) of the above active material mixture.

Next, water was added to the obtained mixture so that the solid content ratio was 50% by mass, and the mixture was mixed for 60 seconds at 2000 rpm using a mixing defoamer (ARE250, available from THINKY CORPORATION).

Then, the obtained mixture was spread on a hot plate at 80° C. and dried to remove moisture, and classified using a classification sieve (75 μm mesh) to obtain a composite secondary particle 1.

Production Example 2 of Composite Secondary Particle

A composite secondary particle 2 was obtained by the same method as in "Production example 1 of composite secondary particle" described above except for adjusting the amount of polyacrylic acid aqueous solution added so that the amount of polyacrylic acid added as a binder is 8% by mass with respect to the mass (100% by mass) of the active material mixture.

Production Example 3 of Composite Secondary Particle

A composite secondary particle 3 was obtained by the same method as in "Production example 1 of composite secondary particle" described above except for adjusting the amount of polyacrylic acid aqueous solution added so that the amount of polyacrylic acid added as a binder is 0.5% by mass with respect to the mass (100% by mass) of the active material mixture.

Production Example 4 of Composite Secondary Particle

A composite secondary particle 4 was obtained by the same method as in "Production example 1 of composite secondary particle" described above except for adjusting the amount of polyacrylic acid aqueous solution added so that the amount of polyacrylic acid added as a binder is 0.2% by mass with respect to the mass (100% by mass) of the active material mixture.

Production Example of Binder-Coated SiO Powder

An aqueous polyacrylic acid solution (PAAH; concentration 35% by mass) containing polyacrylic acid as a binder was added to the SiO powder (available from OSAKA Titanium technologies Co., Ltd, volume average particle diameter (D50)=1 μm) so that the amount of polyacrylic acid (solid content) added is 10% by mass with respect to the mass (100% by mass) of the SiO powder.

Next, water was added to the obtained mixture so that the solid content ratio was 50% by mass, and the mixture was mixed for 60 seconds at 2000 rpm using a mixing defoamer (ARE250, available from THINKY CORPORATION).

Then, the obtained mixture was spread on a hot plate at 80° C. and dried to remove moisture, and classified using a classification sieve (75 μm mesh) to obtain a SiO powder (binder-coated SiO powder) coated with a binder (polyacrylic acid).

Production Example of Lithium Ion Secondary Battery

Example 1

(Preparation of Electrolyte Solution)

As an electrolyte solution, a solution prepared by dissolving a lithium salt (LiFSI(LiN(FSO$_2$)$_2$)) in a solvent (an equal volume mixture of ethylene carbonate (EC) and propylene carbonate (PC)) at a concentration of 2 mol/L was prepared.
(Production of Negative Electrode)

On the other hand, 9.4 parts by mass of the composite secondary particles 1 prepared above, 84.6 parts by mass of uncomposited hard carbon particles, 4 parts by mass of acetylene black [Denka Black® available from Denka Company Limited] (average particle diameter (primary particle diameter): 0.036 μm) as a conductive aid, and 2 parts by mass of carbon nanofibers [VGCF® available from Showa Denko K.K., aspect ratio 60 (average fiber diameter: approximately 150 nm, average fiber length: approximately 9 μm), electrical resistivity 40 μΩm, bulk density 0.04 g/cm$^3$] as a conductive aid were respectively weighed, and were mixed to obtain a negative electrode active material mixture. Then, the obtained negative electrode active material mixture was dried at 180° C. under a reduced pressure of 100 mmHg for 8 hours to remove the contained water.

Next, inside a glove box (controlling a dew point to −64° C.), an electrolyte solution prepared above was added to the above-mentioned dried negative electrode active material mixture so that the solid content ratio of the active material was 51% by mass, and the mixture was added and mixed for 60 seconds under the condition of 2000 rpm using a mixing defoamer (ARE250, available from THINKY CORPORATION) to prepare a negative electrode active material slurry. The dew point was set in the same environment from slurry preparation to electrode coating and battery production. In all cases, the atmosphere inside the glove box was an argon atmosphere.

A copper foil (available from THANK METAL, thickness 10 μm, size 61×72 mm) was prepared as the negative electrode current collector. Next, with the negative electrode current collector fixed, the negative electrode active material slurry prepared above was applied to the surface of the negative electrode current collector using an applicator. At this time, the surface of the negative electrode current collector copper foil was masked using a PET sheet mask so that the size of the slurry coating portion was 33×44 mm. In addition, the coating thickness was controlled to be 370 μm by adjusting the gap of the applicator.

8 aramid sheets (available from Japan Vilene Company, Ltd., thickness 45 μm) were placed on the surface of the slurry after coating, and pressed using a high pressure jack J-1 (available from AS ONE CORPORATION.). The press pressure at this time was 5 MPa, and the process was repeated until the desired electrode density (electrode porosity) was reached to form a negative electrode active material layer. The negative electrode active material layer had a thickness of 286 μm, a porosity of 34%, and an electrode density of 1.00 g/cm$^3$. Here, the value of the electrode density was calculated from a coating area and a film thickness measured by the film thickness meter (the same applies hereinafter). In this way, a negative electrode was produced in which a negative electrode active material layer having a total basis weight of 28 mg/cm$^2$ of the negative electrode active material and the conductive aid was formed on the surface of the negative electrode current collector.
(Production of Positive Electrode)

92 parts by mass of LiNi$_{0.8}$Co$_{0.15}$Al$_{0.05}$O$_2$ powder, which is the positive electrode active material, 6 parts by mass of acetylene black [Denka Black® available from Denka Company Limited] (average particle diameter (primary particle diameter): 0.036 μm) as a conductive aid, and 2 parts by mass of carbon nanofibers [VGCF® available from Showa Denko K.K., aspect ratio 60 (average fiber diameter: approximately 150 nm, average fiber length: approximately 9 μm), electrical resistivity 40 μΩm, bulk density 0.04 g/cm$^3$] as a conductive aid were respectively weighed, and were mixed to obtain a positive electrode active material mixture. Then, the obtained positive electrode active material mixture was dried at 180° C. under a reduced pressure of 100 mmHg for 8 hours to remove the contained water.

Next, inside a glove box (controlling a dew point to −64° C.), an electrolyte solution prepared above was added to the above-mentioned dried positive electrode active material mixture so that the solid content ratio of the active material was 60% by mass, and the mixture was added and mixed for 60 seconds under the condition of 2000 rpm using a mixing defoamer (ARE250, available from THINKY CORPORATION) to prepare a positive electrode active material slurry.

A carbon-coated aluminum foil (available from Showa Denko K.K., carbon layer thickness 1 μm, aluminum layer thickness 20 μm, size 61×72 mm) was prepared as a positive electrode current collector. Next, with the positive electrode current collector fixed, the positive electrode active material slurry prepared above was applied to the surface of the positive electrode current collector using an applicator. At this time, the surface of the positive electrode current collector was masked using a PET sheet mask so that the size of the slurry coating portion was 29×40 mm. In addition, the coating thickness was controlled to be 450 μm by adjusting the gap of the applicator.

8 aramid sheets (available from Japan Vilene Company, Ltd., thickness 45 µm) were placed on the surface of the slurry after coating, and pressed using a high pressure jack J-1 (available from AS ONE CORPORATION.). The press pressure at this time was 5 MPa, and the process was repeated until the desired electrode density (electrode porosity) was reached to form a positive electrode active material layer. The positive electrode active material layer had a thickness of 250 µm, a porosity of 40%, and an electrode density of 2.55 g/cm$^3$. In this way, a positive electrode was produced in which a positive electrode active material layer having a total basis weight of 63 mg/cm$^2$ of the positive electrode active material and the conductive aid was formed on the surface of the positive electrode current collector. In this way, a positive electrode was produced in which a positive electrode active material layer having a total basis weight of 63 mg/cm$^2$ of the positive electrode active material and the conductive aid was formed on the surface of the positive electrode current collector.

(Production of Lithium Ion Secondary Battery)

A battery was formed by sandwiching a separator (5 cm×5 cm, thickness 23 µm, made of Cellguard 2500 polypropylene) between the positive and negative electrodes, and the battery was sandwiched between a copper foil (3 cm×3 cm, thickness 17 µm) with terminals (Ni, 5 mm×3 cm) and a carbon coated aluminum foil (3 cm×3 cm, thickness 21 µm) with terminals (Al, 5 mm×3 cm), and was encapsulated using two commercially available heat-sealing aluminum laminated films (10 cm×8 cm). Then, after injecting 60 µL of the electrolyte solution prepared above, the outer casing body was vacuum-sealed to produce a lithium ion secondary battery.

Example 2

In the production of the negative electrode, the gap of the applicator when the negative electrode active material slurry was applied to the surface of the negative electrode current collector was adjusted, and the thickness of the negative electrode active material layer obtained after the press treatment was changed to 210 µm. Except for this, a lithium ion secondary battery was produced by the same method as in Example 1 described above.

Example 3

In the preparation of the negative electrode active material slurry, the composite secondary particle 2 was used instead of the composite secondary particle 1. Except for this, a lithium ion secondary battery was produced by the same method as in Example 1 described above.

Example 4

In the preparation of the negative electrode active material slurry, the compounding amount of the composite secondary particles 1 was set to 94 parts by mass, and the compounding amount of the uncomposited hard carbon particles was set to zero (that is, the total amount of the negative electrode active material was set to the composite secondary particles 1). In addition, the production of the negative electrode, the gap of the applicator when the negative electrode active material slurry was applied to the surface of the negative electrode current collector was adjusted, and the thickness of the negative electrode active material layer obtained after the press treatment was changed to 279 µm. Except for this, a lithium ion secondary battery was produced by the same method as in Example 1 described above.

Comparative Example 1

In the preparation of the negative electrode active material slurry, the composite secondary particle 3 was used instead of the composite secondary particle 1. Except for this, a lithium ion secondary battery was produced by the same method as in Example 1 described above.

Comparative Example 2

In the preparation of the negative electrode active material slurry, the composite secondary particle 4 was used instead of the composite secondary particle 1. Except for this, a lithium ion secondary battery was produced by the same method as in Example 1 described above.

Comparative Example 3

In the preparation of the negative electrode active material slurry, the compounding amount of the composite secondary particles 1 was set to zero, and the compounding amount of the uncomposited hard carbon particles was set to 94 parts by mass (that is, the total amount of the negative electrode active material was set to the uncomposited hard carbon particles). Except for this, a lithium ion secondary battery was produced by the same method as in Example 1 described above.

Comparative Example 4

In the preparation of the negative electrode active material slurry, the compounding amount of the composite secondary particles 1 was set to zero, the compounding amount of the binder-coated SiO powder prepared above was set to 4.7 parts by mass, and the compounding amount of the uncomposited hard carbon particles was set to 89.3 parts by mass. Except for this, a lithium ion secondary battery was produced by the same method as in Example 1 described above.

[Evaluation Example of Lithium Ion Secondary Battery (Measurement of Discharge Capacity)]

The lithium ion secondary batteries produced in the above-mentioned Examples and Comparative Examples were charged and discharged under the following conditions, and the discharge capacity and the capacity retention rate were measured. The results of these measurements are shown in Table 1 below.

(Measurement Conditions for Discharge Capacity)

Under the condition of 25° C., the lithium ion batteries produced in the Examples and Comparative Examples were charged with a constant current constant voltage (CC-CV) up to 4.2 V with a current of 0.1 C (stop condition: current value is less than 0.01 C in a constant voltage (CV) mode).

Then, it was discharged to 2.5 V with a constant current (CC) of 0.1 C, and the discharge capacity (mAh/g) per mass of the positive electrode active material was determined.

(Measurement Condition of Capacity Retention Rate)

Under the condition of 45° C., the lithium ion batteries produced in the Examples and Comparative Examples were charged with a constant current constant voltage (CC-CV) up to 4.2 V with a current of 0.33 C (stop condition: current value is less than 0.025 C in a CV mode).

After that, the charging and discharging step of discharging to 2.5 V with a current of 0.33 C was repeated 20 times with a 10-minute pause. The capacity retention rate after 20 cycles was obtained by calculating the percentage of the 20th discharge capacity to the initial discharge capacity.

TABLE 1

| | Composition of negative electrode active material | | | | Binder | | Addition amount (with respect to negative electrode active material in composite secondary particle) [% by mass] | Thickness of negative electrode active material layer [μm] | Evaluation of battery performance | |
|---|---|---|---|---|---|---|---|---|---|---|
| | Negative electrode active material in composite secondary particle [% by mass] | | Uncomposited negative electrode active material [% by mass] | | | | | | Initial discharge capacity (relative value) [mAh/g] | Discharge capacity retention rate after 20 cycles [%] |
| | SiO | HC | SiO | HC | Types | Added portion | | | | |
| Example 1 | 5 | 5 | 0 | 90 | PAAH | Composite secondary particle | 5 | 286 | 100 | 60 |
| Example 2 | 5 | 5 | 0 | 90 | PAAH | Composite secondary particle | 5 | 210 | 89 | 68 |
| Example 3 | 5 | 5 | 0 | 90 | PAAH | Composite secondary particle | 8 | 286 | 100 | 80 |
| Example 4 | 50 | 50 | 0 | 0 | PAAH | Composite secondary particle | 5 | 279 | 118 | 45 |
| Comparative Example 1 | 5 | 5 | 0 | 90 | PAAH | Composite secondary particle | 0.5 | 275 | 92 | 20 |
| Comparative Example 2 | 5 | 5 | 0 | 90 | PAAH | Composite secondary particle | 0.2 | 272 | 90 | 20 |
| Comparative Example 3 | 0 | 0 | 0 | 100 | None | — | — | 320 | 81 | 80 |
| Comparative Example 4 | 0 | 0 | 5 | 95 | PAAH | SiO coated | 10 (with respect to SiO active material) | 290 | 94 | 20 |

From the results shown in Table 1, according to the lithium ion secondary battery using the negative electrode according to the present invention, by including the composite secondary particles of the silicon-based negative electrode active material and the carbon-based negative electrode active material produced by using a predetermined amount or more of the binder, it was confirmed that the cycle characteristics were significantly improved even when the constituent components of the electrodes were not bound to each other via the binder. On the other hand, in Comparative Example 1 and Comparative Example 2 in which the amount of the binder used was small, a sufficient effect of improving the cycle durability was not obtained. In Comparative Example 3 in which the silicon-based negative electrode active material was not used, there was no problem of lowering the cycle durability in the first place, but on the other hand, it was confirmed that a sufficient initial discharge capacity was not obtained. Further, also in Comparative Example 4 in which the surface of the silicon-based negative electrode active material (SiO) was coated with a binder, no improvement in cycle durability was observed. From this, in order to obtain the effect of improving the cycle durability, it is important to composite the silicon-based negative electrode active material and the carbon-based negative electrode active material in the form of composite secondary particles using a binder.

This application is based on Japanese Patent Application No. 2018-193618 filed on Oct. 12, 2018, the disclosure of which is incorporated in its entirety by reference.

REFERENCE SIGNS LIST 10, 50 Bipolar secondary battery
11 Current collector
11a Outermost layer current collector on positive electrode side
11b Outermost layer current collector on negative electrode side,
13 Positive electrode active material layer
15 Negative electrode active material layer
17 Electrolyte layer
19 Single battery layer
21, 57 Power generating element
23 Bipolar electrode
25 Positive electrode current collecting plate (positive electrode tab)
27 Negative electrode current collecting plate (negative electrode tab),
29, 52 Battery outer casing body
31 Seal portion
58 Positive electrode tab
59 Negative electrode tab

The invention claimed is:

1. A negative electrode for a non-aqueous electrolyte secondary battery in which a negative electrode active material layer is formed on a surface of a current collector, the negative electrode comprising:
the negative electrode active material layer, which contains a negative electrode active material, wherein:
the negative electrode active material contains composite secondary particles comprising negative electrode active material particles bound via a binder,
the negative electrode active material particles of the composite secondary particles include silicon-based negative electrode active material particles and carbon-based negative electrode active material particles, and
a content of the binder in the composite secondary particles is 1% by mass or more with respect to a total mass of the negative electrode active material particles, a content ratio of the silicon-based negative electrode active particles to the carbon-based negative electrode active material particles contained in the composite secondary particles is 10:1 to 1:3 by mass ratio, and the composite secondary particles in the negative electrode active material layer are not bound to each other via a binder.

2. The negative electrode for a non-aqueous electrolyte secondary battery according to claim 1, wherein a thickness of the negative electrode active material layer is 200 µm or more.

3. The negative electrode for a non-aqueous electrolyte secondary battery according to claim 1, wherein the composite secondary particles contained in the negative electrode active material layer comprise 10% to 100% by mass of the total mass of the negative electrode active material.

4. The negative electrode for a non-aqueous electrolyte secondary battery according to claim 1, wherein a content of the binder in the composite secondary particles is 5% by mass or more with respect to a total mass of the silicon-based negative electrode active material particles and the carbon-based negative electrode active material particles.

5. The negative electrode for a non-aqueous electrolyte secondary battery according to claim 1, wherein a volume average particle diameter D50 of the silicon-based negative electrode active material particles is smaller than a volume average particle diameter D50 of the carbon-based negative electrode active material particles.

6. The negative electrode for a non-aqueous electrolyte secondary battery according to claim 1, wherein the binder contains poly(meth)acrylic acid.

7. The negative electrode for a non-aqueous electrolyte secondary battery according to claim 1, wherein the silicon-based negative electrode active material contains a silicon oxide, $SiO_x$, where $0<x\leq2$.

8. The negative electrode for a non-aqueous electrolyte secondary battery according to claim 1, wherein the carbon-based negative electrode active material contains hard carbon.

9. The negative electrode for a non-aqueous electrolyte secondary battery according to claim 1, wherein the negative electrode active material layer further contains hard carbon that does not form the composite secondary particles.

10. A non-aqueous electrolyte secondary battery, comprising:
a power generating element that comprises:
a negative electrode according to claim 1,
a positive electrode formed by forming a positive electrode active material layer containing a positive electrode active material on a surface of a current collector, and
an electrolyte layer disposed between the negative electrode and the positive electrode and in which an electrolyte is held by a separator.

* * * * *